United States Patent [19]

Finch

[11] Patent Number: 4,967,726
[45] Date of Patent: Nov. 6, 1990

[54] SPACE HEATING AND VENTILATION SYSTEMS FOR BUILDINGS

[75] Inventor: Stanley G. Finch, Beverly, England

[73] Assignee: Stelrad Group Limited, North Humberside, England

[21] Appl. No.: 356,075

[22] Filed: May 24, 1989

[30] Foreign Application Priority Data

May 24, 1988 [GB] United Kingdom ................ 8812252
May 24, 1988 [GB] United Kingdom ................ 8812253

[51] Int. Cl.⁵ .............................................. F24H 3/00
[52] U.S. Cl. ............................. 126/99 R; 126/110 R; 126/116 B; 237/48
[58] Field of Search ............. 126/99 R, 110 R, 116 B; 165/7, 8, 10; 237/48

[56] References Cited

U.S. PATENT DOCUMENTS

| | | | |
|---|---|---|---|
| 3,401,740 | 9/1968 | Trudeau | 165/7 |
| 3,695,250 | 10/1972 | Rohrs et al. | 165/7 X |
| 4,497,361 | 2/1985 | Hajicek | 165/7 |
| 4,542,782 | 9/1985 | Berner | 165/8 X |
| 4,836,183 | 6/1989 | Okuno et al. | 126/110 B X |

Primary Examiner—Larry Jones
Attorney, Agent, or Firm—Watson, Cole, Grindle & Watson

[57] ABSTRACT

A heating and ventilation unit has a ceramic heat wheel rotatable within a housing between first and second plenums through which fresh and stale air, respectively, are forced to pass in a hot air ventilation system. The heat wheel is made of cordierite material such as is used in catalytic conversion systems for automobiles. It is formed with non-communicating and axially-extending parallel pores having a pore density of 62 pores per sq. cm. As it rotates the heat wheel transfers to the fresh air both the heat generated by a gas burner in the second plenum, and also low grate heat contained in the stale air. The burner is housed within a combustion housing by means of which the combustion gases are confined to a generally D-shaped area of the heat wheel. The combustion housing is spaced from the walls of the second plenum to form an annular passage through which unheated stale air passes to cool the walls of the second plenum and purge any combustion gases from the pores of the heat wheel entering the first plenum. Humidification of the fresh air may be achieved by water sprayed onto the upstream surface of the heat wheel in the first plenum.

22 Claims, 5 Drawing Sheets

SPACE HEATING AND VENTILATION SYSTEMS FOR BUILDINGS

BACKGROUND OF THE INVENTION

1. Field of the Invention

This invention relates to space heating and ventilation systems for buildings, and concerns a heating and ventilation unit for such a system.

2. The Prior Art

Hot air ventilation systems for buildings are well known in many forms, the usual form being that in which fresh air is directed past a heating and ventilation unit which raises the temperature of the air before releasing it into the various rooms of the building, to which it is distributed through suitable ducting. Stale air escapes from the building to the atmosphere outside through extractor fans, ventilators (such as air bricks) or both, and through cracks around windows and doors.

The air is customarily heated either by combustion of fuel, which may be gas or oil or solid fuel, or by electricity. In the case of heating and ventilation units employing the combustion of fossil fuels, the hot and potentially toxic products of combustion are not allowed to mingle with the fresh air being heated, but instead are vented to the atmosphere after giving up some of their heat by indirect transfer to the fresh air. Previously, this has been achieved by a static heat exchanger located in the fresh air flow. However, the heat exchangers used hitherto have been thermally inefficient in relative terms, and attempts to improve their efficiency (for example, by the use of extended surface heat transfer elements) have met problems of increased noise and have required more powerful fans. The use of electricity for heating the fresh air is acceptable environmentally, but inherently expensive.

In order to improve the thermal efficiency of hot air ventilation systems it has been proposed to use the heated stale air being extracted from the building to heat the fresh air entering it. In a known systems the two gas flows are constrained to pass through a static plate heat exchanger generally in cross-flow mode. However, the thermal efficiencies of place heat exchangers are relatively low, especially if, as in these applications, the fluids being handled are gaseous and their difference in temperature is not large. In order to achieve an acceptable thermal efficiency for the whole hot air ventilation system, therefore, some recirculation of extracted air back into the building has hitherto been considered necessary. However, such recirculation of air carries a resultant health risk arising from the possible spread of air-borne bacteria and viral infections throughout the building.

A further form of energy recuperation which has been proposed for hot air ventilation systems in commercial and industrial buildings is a rotary heat exchanger through which the stale and fresh air flows are caused to pass in opposite directions. In this case the thermal transfer elements are formed of superimposed layers of alternately flat and corrugated aluminium foil forming a multiplicity of gas passages which extend axially of the heat exchanger. However, these heat exchangers have an operating temperature limit of 70° C. and require an extended multistage process to provide a hygroscopic coating for applications where total heat (rather than solely sensible heat) is to be transferred. A somewhat similar coating process enables the heat exchangers to be used for sensible heat (only) applications at temperatures up to 350° C. In either case, the rotary heat exchanger is not capable of withstanding the temperatures of 600° C. or more which are typical of the (uncooled) gases produced by fossil fuel combustion.

From the foregoing it will be understood that the use of fossil fuel heating together with heat recuperation in hot air ventilation systems has hitherto generally required two heat exchangers, one for transferring heat from the combustion gases to the fresh air, and the other for preheating the fresh air with the stale air from the space being heated and ventilated. It has further been proposed, however, that by use of a temperature resistant material (e.g. a ceramic), that a single rotary heat exchanger can be used to perform both the heating and recuperation functions. Two such arrangements are particularly described with reference to FIGS. 2 and 3 of GB Patent Publication No. 2143027A. Each of these arrangements has a rotary heat exchanger formed of two concentric discs through the radially outer one of which the majority of the stale air is passed and through the radially inner one of which the remainder of the stale air is passed after heating by, for example, natural gas. The discs are stated to be preferably ceramic but their composition is not specified; moreover, it is suggested that they should be formed by winding alternate flat and corrugated sheets, presumably in spiral manner.

The fresh air to be heated is passed through the discs of the heat exchanger of Publication No. 2143027A in contraflow mode to the stale air, so as with rotation of the heat exchanger to extract from the heat exchanger the heat supplied by the stale air and the gas burner. Headers are provided for segregation of the individual flows of gas from one another on each side of the heat exchanger, but it is not specified in what proportions these headers divide each disc between the stale and fresh air flows, nor is there any provision described for ensuring that the possibly toxic combustion products of the burner will not be carried over by the heat wheel and so mingle with the fresh air entering the building. Thus, whilst Publication 2143027A generally describes a hot air ventilation system which employs a rotary heat exchanger of a ceramic material arranged both for heating the incoming fresh air by means of a fossil fuel burner and for recuperating heat from the exiting stale air, the disclosure of Publication 2143027A is lacking in certain important details; moreover, Applicants believe that by confining the hot gases to only a minor portion of the heat exchanger, the heat exchanger is underutilised thermally and is correspondingly bulky and expensive to produce.

SUMMARY OF THE INVENTION

The present invention seeks to provide a heating unit for a hot air ventilation system which inherently is compact, lightweight and cheap to produce, can be operated at the high temperatures of 600° C. or more generated at relatively low cost by a gas burner, has a high thermal efficiency, and is safe from danger of contamination of the incoming fresh air by the combustion products of the burner.

In accordance with the invention from one aspect there is accordingly provided a heating and ventilation unit for a hot air ventilation system, which comprises a ceramic heat wheel having a multiplicity of gas passages for gas flow therethrough and rotatable within a housing which is subdivided generally axially to form first and second plenums through which the heat wheel may rotate, the unit being arranged for fresh air to be heated to pass through the gas passages of the heat wheel in one direction in the first plenum, and for stale air to pass through the gas passages of the heat wheel in the opposite direction in the second plenum, the unit including a heating means located upstream of the heat wheel in the second plenum for heating most, but not all, of the stale air, and confinement means to confine the stale air heated by the heating means to within a first area of the heat wheel which is surrounded by a second, annular area at which the unheated stale air is directed to pass through the heat wheel, the first area occupying 60 to 95 per cent of the plan area of the heat wheel in the second plenum.

The above and other aspects and features of the invention will become more fully apparent from the following description of a heating and ventilation unit for a hot air ventilation system given, by way of example, with reference to the accompanying drawings.

DETAILED DESCRIPTION OF THE PREFERRED EMBODIMENTS

Figure 4:
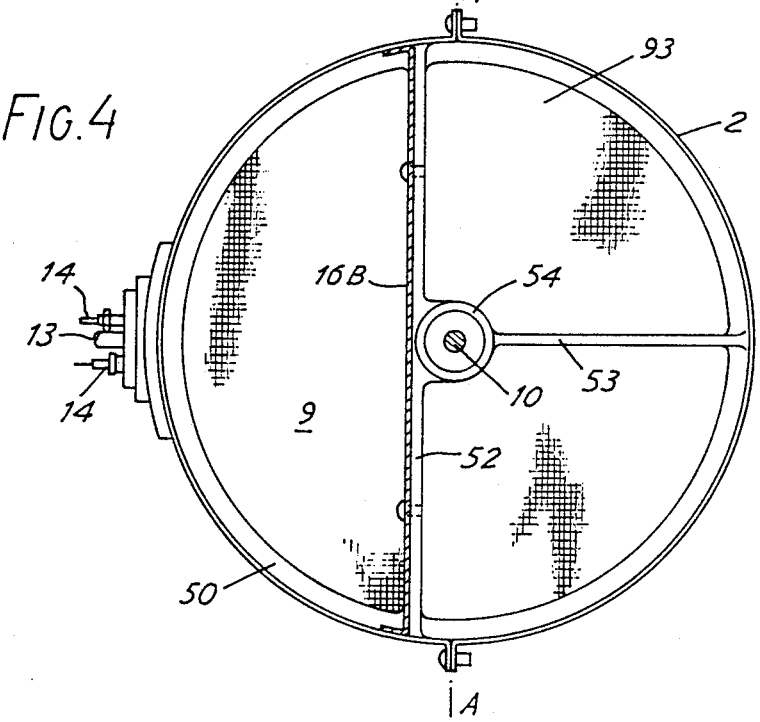
FIG. 4 is a section along line IV—IV in FIG. 1.
Figure 5:
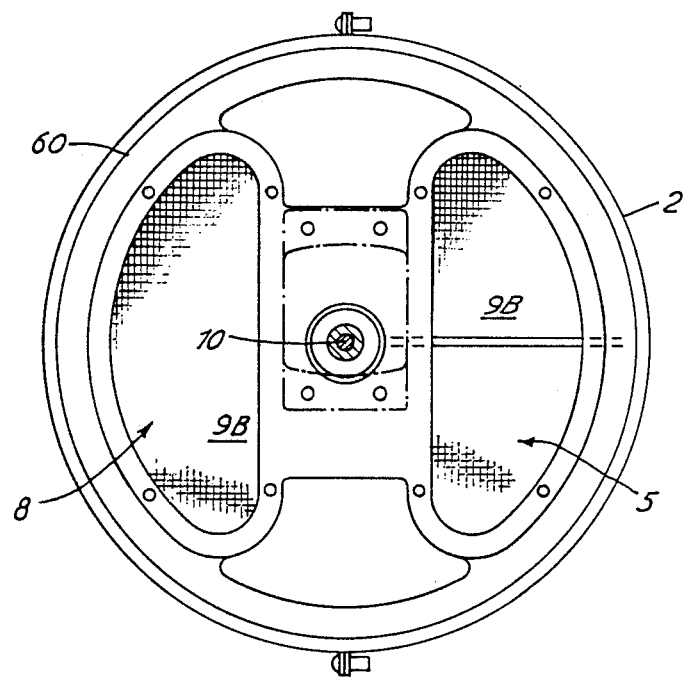
FIG. 5 is a section along line V—V in FIG. 1.

With reference to these Figures a heating and ventilation unit 1 for a building has a generally cylindrical housing 2 which is mounted with its axis vertical between apertured cover plates 60, 61 at its top and bottom ends. The interior of the unit is subdivided substantially axially by a generally vertical wall 16 to provide two separate but adjacent first and second plenums 3 and 4 each of generally semicylindrical shape. As shown, the plenums 3, 4 have respective pairs of inlet and outlet ducts 5/7, 6/8 for transmission of gas through the plenums. Ducts 5 and 7 constitute respectively the cold fresh air inlet and hot fresh air outlet of the unit. Duct 6 admits stale air from the building while duct 8 acts as an outlet flue for that stale air, following heating of the air. Fans (not shown) are mounted in the ducts 5 and 6 and arranged to drive the fresh air and stale air (respectively) through the unit 1 in opposite directions as indicated by the arrows. Attached to the housing 2 about one-third down its length is the skirt 50 of a heat wheel support member 51 of cast metal constructions. As shown in FIG. 4 the member has two horizontal webs 52, 53 which are arranged generally in T-formation and are connected integrally to the top edge of the skirt 50 at their free ends. The major web 52 extends generally across the unit housing 2 and is offset towards the plenum 4 in relation to the central diametral plane AA of the unit 1. Fastened to the web 52 is an upper part of the wall 16 which extends vertically upwardly to the upper cover plate 60, to which it is secured. The minor web 53 is generally orthogonal to the web 52, and a bearing support 54 is provided by the member 51 at the junction of the webs 52, 53.

A ceramic heat wheel 9 is mounted within the skirt 50 for rotation about a vertical axis, between axially aligned lower and upper parts 16A, 16B of the dividing wall 16. The heat wheel has a vertical, upwardly extending shaft 10 which is journalled in bearings 55 within the bearing support 54. An electric motor 11 is mounted on the top cover plate 60 and connected to the shaft 10 by a flexible coupling 41 for rotating the heat wheel.

The heat wheel is thus divided approximately equally between the two plenums 3, 4. It is made of a refractory ceramic material providing a multiplicity of minute, parallel passages for gas flow. One such material is formed of cordierite (Magnesium Alumina Silicate) and is manufactured and marketed by Corning Glass Works under the type designation 400; it has a thickness of 6 cm and is formed with a multiplicity of square-section passages each extending through its thickness and having a distribution density of 62 $cm^{-2}$. The passages extend axially of the wheel, between the opposed faces 9A, 9B of the latter. They are separated from one another so that, in operation of the unit 1, there is not possibility of migration of gas between them within the confines of the wheel.

Figure 1:
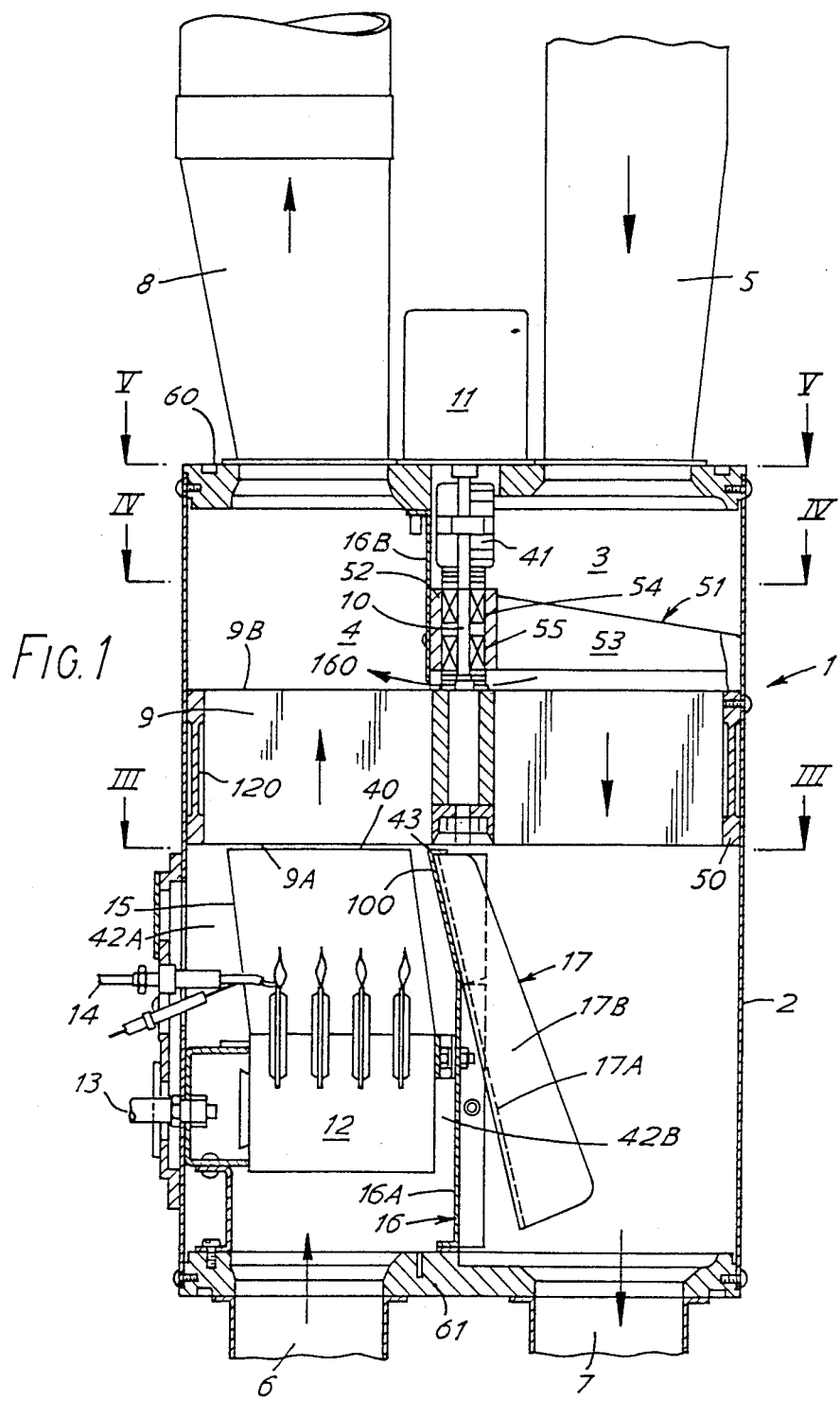
FIG. 1 shows a heating and ventilation unit embodying the present invention, as seen on a section taken along the line I—I in FIG. 2.
Figure 2:
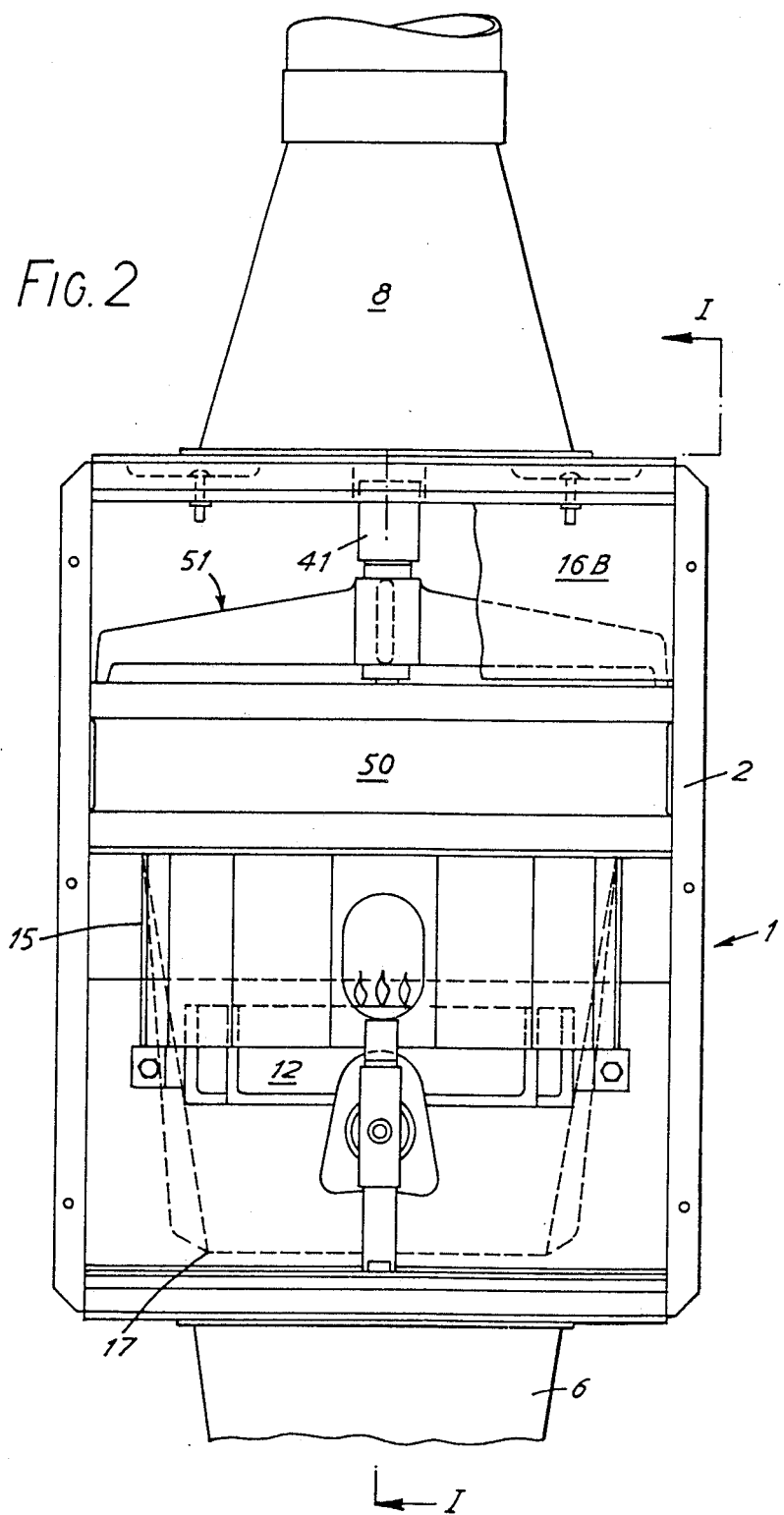
FIG. 2 is a front elevation of the unit of FIG. 1 with the front cover removed, and when partly broken away to reveal internal detail.

Below that part of the wheel 9 in the left hand, second plenum 4 is mounted a multi-blade gas burner unit 12 (with associated gas supply and ignition systems 13/14) of 5 kw nominal capacity. The burner unit is housed within a combustion housing 15 arranged for guiding the hot combustion gases upwards towards the lower face 9A of the heat wheel 9; a further function of the combustion housing is to shield the adjacent walls of the housing 2 and the part 16A of the dividing wall 16 from the flames of the burner unit 12. As is clearly shown in FIGS. 1 and 3, the upper free edge 40 of the combustion housing 15 is D-shaped as seen in plan view and located closely adjacent to the undersurface 9A of the heat wheel; also visible in those Figures is an annular passage by which the combustion housing is spaced from the housing 2 and wall part 16A. In the drawings the annular passage is denoted generally by the reference numeral 42, its parts corresponding to the housing 2 and wall part 16A being denoted 42A, 42B respectively.

Below the heat wheel 9 in the right hand, first plenum 3 is mounted a shaped deflector plate 17 arranged to ensure that the adjacent walls and floor of the housing 2 and the part 16A of the dividing wall 16 are not subjected to excessive temperatures by the hot fresh air leaving the heat wheel. The deflector has a plane central region 17A, and upstanding but downwardly convergent cheeks 17B on each side. It is mounted at an inclination to the central axis of the unit so as to funnel the hot fresh air received from the heat wheel towards the outlet duct 7.

Figure 3:
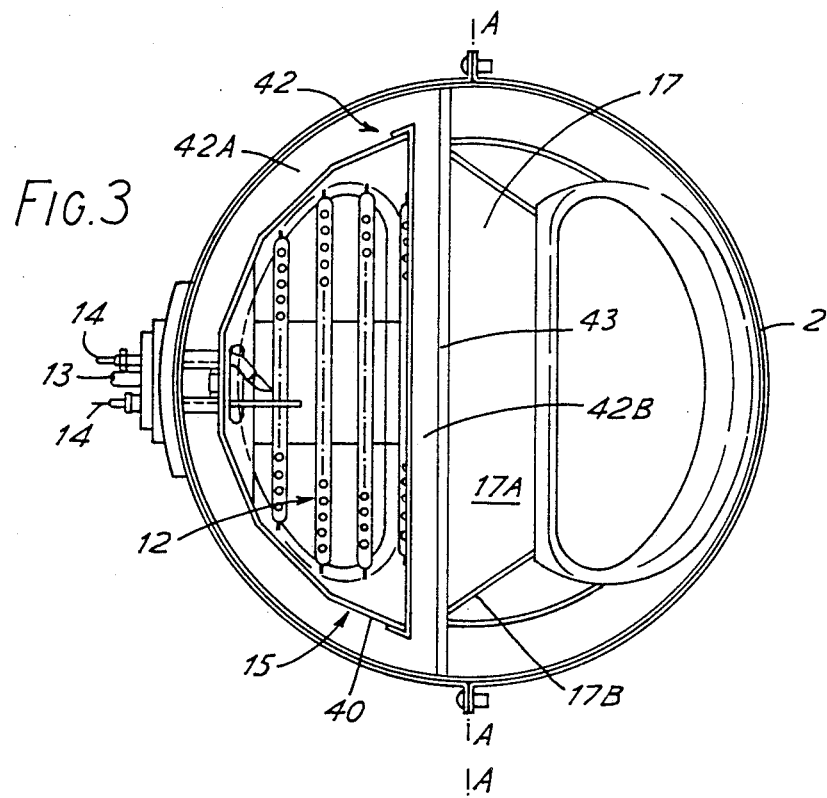
FIG. 3 is a section along the line III—III in FIG. 1.

As will be seen from FIG. 3 in particular, at its top end the deflector plate 17 intrudes into the generally semicylindrical part of the unit 1 occupied by the plenum 4. The lower wall part 16A is locally inclined at 100 to follow the central region 17A of the deflector plate, the wall part 16A and the deflector plate central region terminating closely beneath the heat wheel at a flanged free edge 43. The offset position of the edge 43 towards the plenum 4 (in relation to the plane AA) is clearly visible in FIG. 3. Also clearly visible in that drawing is the spacing of the free edge 43 from the free edge 40 of the combustion housing 15 by the generally diametrically directed part 42B of the annular passage 42. The upper part 16B of the wall 16 is vertical, and aligned with the free edge 43 so as itself to be offset in relation to the plane AA.

In operation the heat wheel 9 is rotated at a constant speed typically of 30 rpm, and stale air at ambient temperature from the building in which the heating and ventilating unit is located is forced into the inlet duct 6 by the associated fan. Most of this air then moves upwardly through the combustion housing 15 past the burner unit 12 and is heated by the burner unit, typically to a temperature to 600° C., before entering the multiplicity of minute channels of the part of the heat wheel 9 which at the time in question is located in the plenum 4. This heated stale air is confined by the combustion housing 15, in particular its free edge 40, to a D-shaped segment of the heat wheel. The remainder of the stale air passes along the annular passage 42 separating the combustion chamber 15 from the housing 2 and the lower part 16A of the dividing wall 16. It is unheated by the burner unit 12 and therefore serves to cool the surfaces along which it passes. The housing 2 is therefore cool to the touch, and the wall 16 and the combustion housing 15 are maintained at a relatively low temperature consistent with long life operation.

The unheated stale air passes upwardly from the annular passage 42 and thence enters the passages of the heat wheel at a correspondingly shaped annular region corresponding in plan view to the passage 42. Within the heat wheel, the unheated stale air thus occupies a narrow band extending around the heat wheel periphery and a further narrow band extending substantially diametrically across the heat wheel, these bands corresponding to the parts 42A and 42B of the passage 42 and together completely surrounding the D-shaped segment of the heat wheel through which the heated stale air and the combustion products of the burner unit 12 are passing. It should be noted that because of the mutual separation of the passages of the heat wheel as mentioned above, no migration of gases from one passage to another can occur within the heat wheel, and in particular the unheated stale air passing through the diametral band of the heat wheel remains uncontaminated by the possibly toxic combustion products of the gas burner unit 12.

Having left the heat wheel and given up most of their sensible heat (above ambient temperature) to it, the gases passing through the heat wheel in the plenum 4 recombine before leaving the unit 1 via the outlet duct 8. Heat which is transferred to the heat wheel in this way is held by the heat wheel and, on rotation of the heat wheel into the first plenum 3, is delivered to the cold fresh air at ambient temperature which passes downwardly through the passages of the heat wheel after entering through the duct 5. The fresh air is therefore heated to a temperature typically within the range 120°-150° C., and leaves the plenum 3 through the outlet duct 7, with guidance provided by deflector plate 17. From the duct 7 the hot fresh air is distributed by ducting, etc., (not shown) to the space to be heated and ventilated. It will therefore be understood that the unit 1 serves not only to recuperated the low grate heat of the stale air before the latter leaves the building, but at the same time it also acts as an efficient heat exchanger by which the heat generated by the gas burner unit 12 is transmitted to the fresh air entering the building.

An important feature of the described arrangement is provided by the annular passage 42 and the unheated (by the burner unit 12) stale air which flows through it. Not only does this flow of air ensure that the unit 1 as a whole runs cool as previously mentioned, but also the diametrically extending part 42B of the passage provides a break of sufficient width to ensure that any combustion products of the burner unit have left the passages of the heat wheel by the time that those passages have begun to pass beneath the upper part 16B of the dividing wall 16 and enter the first plenum 4.

The width of the passage part 42B is chosen to be slightly greater than the circumferential movement of the heat wheel which occurs during the transit time of the stale air between its faces 9A, 9B. Furthermore, the fans associates with the ducts 5, 6 are arranged so that during operation of the unit 1 the static pressure in the first plenum 3 upstream of the heat wheel is somewhat greater than the static pressure in the second plenum 4 downstream of the heat wheel. A pressure differential therefore exists by which fresh air is caused to flow between the two plenums through a small clearance formed between the upper surface 9B of the heat wheel and the lower edge of the upper part 16B of the partition wall; in FIG. 1 this air flow is represented by the arrow denoted 160. The air flow 160 together with the mutual isolation of the gas passages within the heat wheel and the break represented by the passage part 42B together ensure that there is no possibility that combustion products from the burner unit 12 will be carried over to the fresh air passing through the plenum 3. Moreover, the upward flow of cool stale air provided by the passage part 42B and the fresh air flow 160 serve to cool not only the part 16B of the partition wall but also the shaft 10 and bearings 55 of the heat wheel 9. The bearings 55 therefore have no requirement for heatresistance, and can be relatively cheap.

Figure 6:
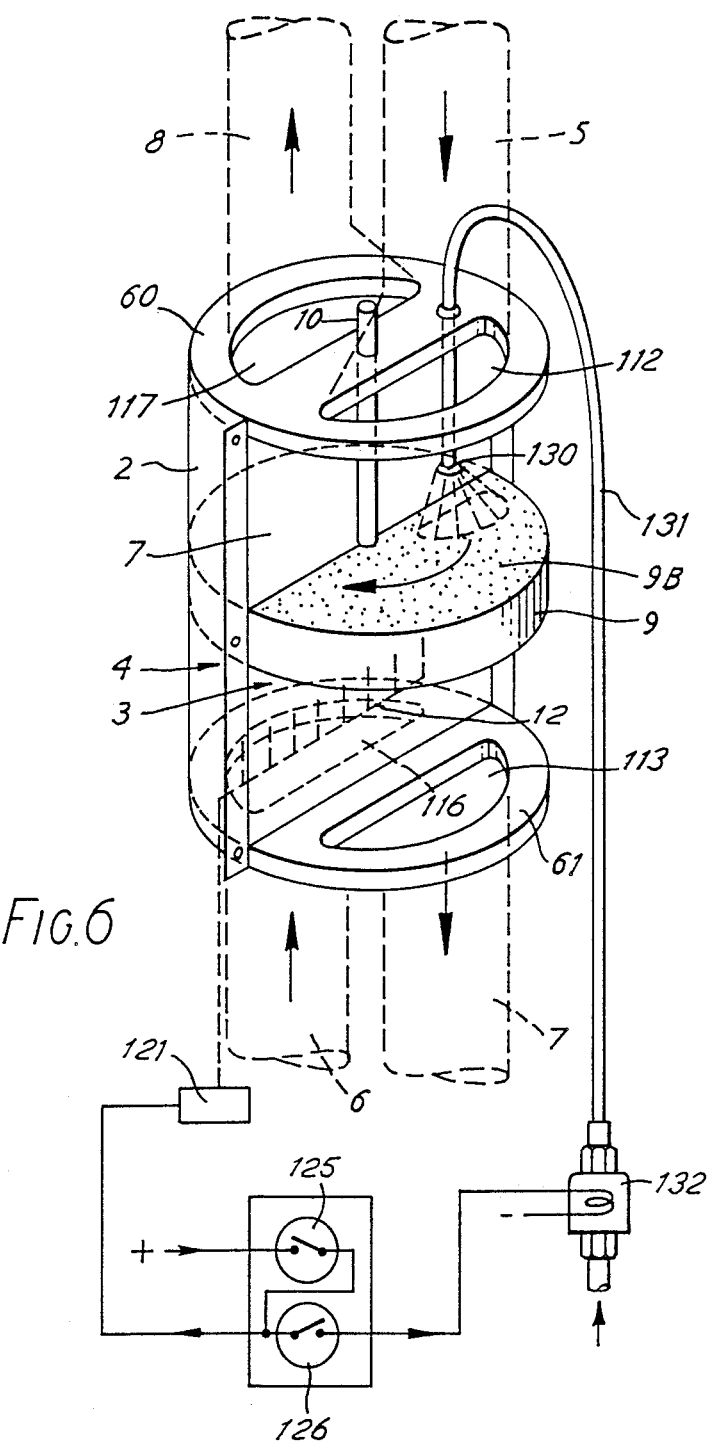
FIG. 6 is a schematic representation of the unit when provided with an air humidification facility.

As is apparent from FIG. 6 with reference to which the following designation is given, the unit 1 may be advantageously arranged not only to heat the incoming fresh air by heat from the burner unit 12 and by recuperation from the outgoing stale air, but also to humidify the fresh air to a required degree. Referring now to FIG. 6, it will be seen that means are provided for delivering a supply of water on to the upstream surface of the ceramic heat wheel 9 in the second plenum 3. In the drawing this means takes the form of a jet nozzle 130 supported above the heat wheel and adapted to direct an atomised spray of predetermined configuration against upper surface 9B forming the upstream surface of the heat wheel. The water, purified or softened as necessary, is supplied by the nozzle from a suitable source through a pipeline comprising a nylon tube 131 and a high pressure pump, such as a solenoid operated pump 132. The nozzle is arranged to direct the spray on to an area of the wheel surface having the shape of a segment centred approximately on the wheel axis and located adjacent the partition wall 16 where the wheel enters the plenum 3. The water is therefore directed at the hottest part of the heat wheel within the plenum 3, or ensuring complete vaporisation of the water. The hygroscopic nature of the cordierite material of the heat wheel further assists the vaporisation process.

The pump 132 and a control unit 121 of the burner 12 are connected electrically to a combined room thermostat 125 and a room humidistat 126. If the room temperature falls below the set on the thermostat the burner is ignited for raising the temperature of the incoming air;

if, in addition, the relative humidity falls below that set by the humidistat, the pump 132 is activated and water is sprayed on to the heat wheel so as to raise the humidity of the incoming air, as required. From health considerations (e.g. against legionnaires disease), the wiring arrangement is made such that the pump 132 cannot be operated when the burner is extinguished.

In operation of the heat exchange device, the pump 132 (assuming it to be operating) causes the nozzle 130 to generate a water spray which impinges against the upstream surface 9B of the heat wheel 9 in the fresh air plenum 3. The water of the spray becomes evaporated under the combined effects of the hot wheel and the flow of fresh air through the plenum 3. Thus, the fresh air is raised in temperature and humidified as it passes through the heat wheel along the small internal passages thereof. Additionally, the air and water are sterilised due to the high temperatures existing within the wheel.

The evaporation of the water makes it possible for the temperature on the upstream surface of the wheel to be reduced in plenum 3 to the outside ambient saturated wet bulb temperature, which means that the fuel gases exiting from plenum 4 can be below the temperature of the fresh air entering the plenum 3. Consequently, the heat recovery from the stale air and combustion gases is enhanced by the latent heat of evaporation of the water supplied.

When the desired humidity level is attained the humidistat 126 interrupts the operation of the pump 132 and hence the delivery of water to the nozzle 130, and the fresh incoming air is then heated by the heat exchanger without any humidification. Similarly, when the room temperature reaches that set by the thermostat 125, the burner 12 will be extinguished, operation of the pump 132 also being interrupted if it is running, and the heat exchanger continues to heat the incoming fresh air with the heat recovered from the extracted stale air.

To permit further energy savings a burner of variable output could be used allowing it to be operated at a reduced load sufficient to compensate for heat lost through the building structure. The temperature of the extracted stale air can be sensed and the burner controlled to maintain this temperature substantially constant and at the desired level.

In addition or alternatively to providing for humidification as described above with reference to FIG. 6, the unit 1 may advantageously be associates with a refrigeration unit past which the fresh air leaving via the outlet duct 7 is directed in hot weather, when the gas burner unit 12 is unenergised. The air passing through the second plenum 4 may then be substantially cooler than the fresh air passing through the first plenum 3, and under these circumstances the heat wheel transfers heat in the opposite direction from the direction previously described, so as by abstracting heat from the plenum 3 to cool the incoming fresh air.

From FIG. 3 of the drawings it will be seen that in the described embodiment the heated gas from the gas burner unit 12 occupies approximately 75 per cent of the plan area of the part of the heat wheel which is devoted to the stale air flow. Applicants believe that for efficient thermal utilisation of the heat wheel the area of the latter which should be devoted to the combustion gases should be the maximum possible, commensurate with the requirement to cool the unit and prevent carry-over of combustion products into the first air plenum. In accordance with the invention, therefore, Applicants proposed that between 60 and 95 per cent of the stale air flow region of the heat wheel should be devoted to the combustion gases, the remainder of the stale air flow region being devoted to unheated stale air and being advantageously in the form of a generally D-shaped annulus which extends around the periphery of the heat wheel and substantially diametrically across it so as to envelop the combustion gases completely. Particularly if the heat wheel is driven centrally rather than peripherally (as particularly described), the diametrically extending part of the annulus is preferably offset inwardly towards the stale air region so as to enable the centre of the heat wheel and the associated drive mechanisms to be cooled. However, such offsetting is not essential to the invention; if desired the diametrically extending part of the annulus may be centre on, or it may border, the diameter of the heat wheel; for some applications it may be offset in the opposite direction towards the fresh air plenum.

Also shown in the drawings is a continous groove 120 which is formed around the inside of the skirt 50. The function of this groove is to act as a labyrinth seal preventing any substantial flow of gas past the periphery of the heat wheel in either plenum 3, 4. In addition, the groove allows the higher pressure fresh air from the first plenum 3 to move around the circumference of the heat wheel and into the second plenum 4; in doing so it prevents stale air from the second plenum from leaking into the first plenum around the wheel periphery in the opposite direction.

Whilst in the described embodiment the diametrically extending part 42B of the passage 42 is parallel-sided (when considered transversely of the unit), for some applications it may be advantageous to use a non-parallel configuration of the passage; for example, the passage may be wider at its end where the heat wheel leves the second plenum than at its end where the heat wheel first enters the second plenum.

Whilst for the reasons given above it is preferred that the heat wheel should have its gas passages formed by an extruded matrix of mutually isolated, regular parallel passages each of which extends through the depth of the heat wheel in the direction of gas flow, as an alternative the heat wheel may be formed of randomly distributed ceramic filaments the intersticial spaces of which are communication to form tortuous paths for gas flow between the faces of the heat wheel. In either case the pore density transversely of the heat wheel is desirably from 100 to 1400 pores per sq. inch and most preferably about 300 to 400 pores per sq. inch.

The invention may utilise any suitable gaseous or liquid fuel for heating the heat wheel, natural gas being preferred for its relative cheapness and cleanliness. Moreover, the invention may also provide advantages over conventional devices if electrical heating is employed.

What is claimed is:

1. A heating and ventilation unit for a hot air ventilation system, comprising a housing, a ceramic heat wheel having a multiplicity of gas passages for gas flow therethrough and rotatable within said housing, the housing being subdivided generally axially to form first and second plenums through which the heat wheel may rotate, for fresh air to be heated to pass through the gas passages of the heat wheel in one direction in the first plenum, and for stale air to pass through the gas passages of the heat wheel in the opposite direction in the second plenum, a heating means located upstream of the heat wheel in the second plenum for heating most, but not all, of the stale air, and confinement means to confine the stale air heated by the heating means to within a first area of the heat wheel, said first area being surrounded by a second, annular area at which the unheated stale air is directed to pass through the heat wheel, the first area occupying 60 to 95 per cent of the plan area of the heat wheel in the second plenum.

2. A unit according to claim 1, wherein the first area occupies approximately 75 per cent of the plan area of the heat wheel in the second plenum.

3. A unit according to claim 1, wherein the heating means is a gas burner, and the confinement means comprises an open-ended combustion housing surrounding the burner and disposed at a spacing from the housing walls confining the second plenum, the combustion housing having a downstream free edge closely adjacent the heat wheel, and the said free edge defining the said first area of the heat wheel.

4. A unit according to claim 1, further comprising fan means arranged for creating flows of fresh and stale air through the first and second plenums respectively, and a pressure in the first plenum upstream of the heat wheelf greater than the pressure in the second plenum downstream of the heat wheel.

5. A unit according to claim 1, wherein the heat wheel is generally cylindrical and rotatably disposed in a bore of a housing member, the bore being enlarged over an intermediate portion of the length of the heat wheel so as to form a continuous groove around the heat wheel periphery, said groove forming a labyrinth seal against escape of gas past the heat wheel in each plenum.

6. A unit according to claim 1, wherein the ceramic of the heat wheel is cordierite.

7. A unit according to claim 1, wherein the heat wheel is formed of a ceramic material having a matrix of non-communicating pores which extend between opposed faces of the heat wheel as the gas passages thereof.

8. A unit according to claim 7, wherein the pores have a density transversely of the heat wheel of between 100 and 1400 pores per sq. inch.

9. A device according to claim 1, wherein the heat wheel is formed of a ceramic material having a sponge-like nature, the pores of the ceramic material being tortuous and the gas passages extending generally axially of the heat wheel between the opposed faces thereof.

10. A unit according to claim 9, wherein the pores have a density transversely of the heat wheel of between 100 and 1400 pores per sq. inch.

11. A unit according to claim 8 or 10, wherein the pore density transversely of the heat wheel is approximately 300 to 400 pores per sq. inch.

12. A unit according to claim 1, including drive means kinematically coupled to the heat wheel to centrally drive the heat wheel, the drive means being located on the downstream side of the heat wheel in relation to the second plenum, the subdivision of the housing to form the first and second plenums being offset laterally, towards the second plenum so that the drive means is associated thermally with the first plenum.

13. A unit as claimed in claim 12 which includes means to inhibit operation of the supply means except when the heating means is operating.

14. A unit according to claim 1, including supply means for supplying water onto the upstream surface of the heat wheel in the first plenum for the water to be vaporised by heat supplied to said heat wheel by said heating means.

15. A unit as claimed in claim 14, wherein the supply means comprises a nozzle arranged for directing a spray of water onto the said upstream surface of the heat wheel in the first plenum.

16. A unit as claimed in claim 15, wherein the nozzle is adapted to produce a spray of atomised droplets.

17. A unit as claimed in claim 14, wherein the nozzle is arranged to direct the spray over a confined surface area adjacent a boundary of the first plenum at which the heat wheel enters the first plenum during rotation thereof.

18. A unit as claimed in any one of claims 14, wherein the supply means includes a supply pipe and flow control means for controlling flow of water through the supply pipe.

19. A unit as claimed in claim 18, wherein the flow control means comprises a pump.

20. A unit as claimed in claim 18, wherein the flow control means is coupled to a humidity sensor.

21. A unit as claimed in claim 1, including liquid supply means arranged for supplying onto the upstream surface of the heat wheel in said first plenum a liquid which is capable of being vaporised by heat supplied to said heat wheel by said stale air.

22. A heating and ventilation unit for a hot air ventilation system, comprising a housing, a ceramic heat wheel having pores defining a multiplicity of gas passages for gas flow therethrough and rotatable within the housing, said pores having a density transversely to the heat wheel of 100 to 1400 pores per sq. inch, partition means subdividing the housing generally axially to form first and second plenums through which the heat wheel may rotate, means for flowing fresh air to be heated through the gas passages of the heat wheel in one direction in the first plenum and for flowing stale air through the gas passages of the heat wheel in the opposite direction in the second plenum, a heating means located upstream of the heat wheel in the second plenum for heating most, but not all, of the stale air flow, and annular flow confinement means in the second plenum for conducting the stale air heated by the heating means to a first area of the heat wheel, said first area being delimited by a free edge of the flow confinement means located closely adjacent the heat wheel and being surrounded by a second, annular area at which the unheated stale air flowing outwardly of the flow confinement means is directed to pass through the heat wheel, the first area occupying 60 to 95 per cent of the plan area of the heat wheel in the second plenum.

* * * * *